United States Patent
Klein et al.

[15] 3,663,892
[45] May 16, 1972

[54] METAL ION LASER HAVING AN AUXILIARY GAS

[72] Inventors: Marvin Bertrand Klein, Long Beach; Thomas Patrick Sosnowski, Colts Neck, both of N.J.

[73] Assignee: Bell Telephone Laboratories, Incorporated, Murray Hill, N.J.

[22] Filed: June 15, 1970

[21] Appl. No.: 46,097

[52] U.S. Cl. ............................ 331/94.5, 313/223, 313/225
[51] Int. Cl. .......................................... H01s 1/06, H01s 3/09
[58] Field of Search ............................ 331/94.5; 313/223

[56] References Cited

OTHER PUBLICATIONS

Goldsborough, Applied Physics Letters, 15, (6), 15 Sept. 1969, pp. 159–161.

Fendly, Jr. et al., RCA Review, 30, Sept. 1969, pp. 422–428.
Silfuast et al., Applied Physics Letters, 13, 1968, pp. 169+

Primary Examiner—William L. Sikes
Assistant Examiner—R. J. Webster
Attorney—R. J. Guenther and Arthur J. Torsiglieri

[57] ABSTRACT

There are disclosed cadmium ion lasers in which gettering of helium by cadmium deposited on walls near the discharge is counteracted by maintaining the coolest region frequented by cadmium ions above about 100° C, although preferably about 150° C, and away from the discharge. One embodiment employs a tube having an enlarged region or sidearm to remove the coolest region from the discharge. A preferred embodiment disposes the cathode in a housing of larger diameter than the diameter of the tube around the discharge, the cathode being at a position in the housing establishing a variation in wall temperature to compel the spent cadmium to be deposited behind the cathode with respect to the discharge.

10 Claims, 2 Drawing Figures

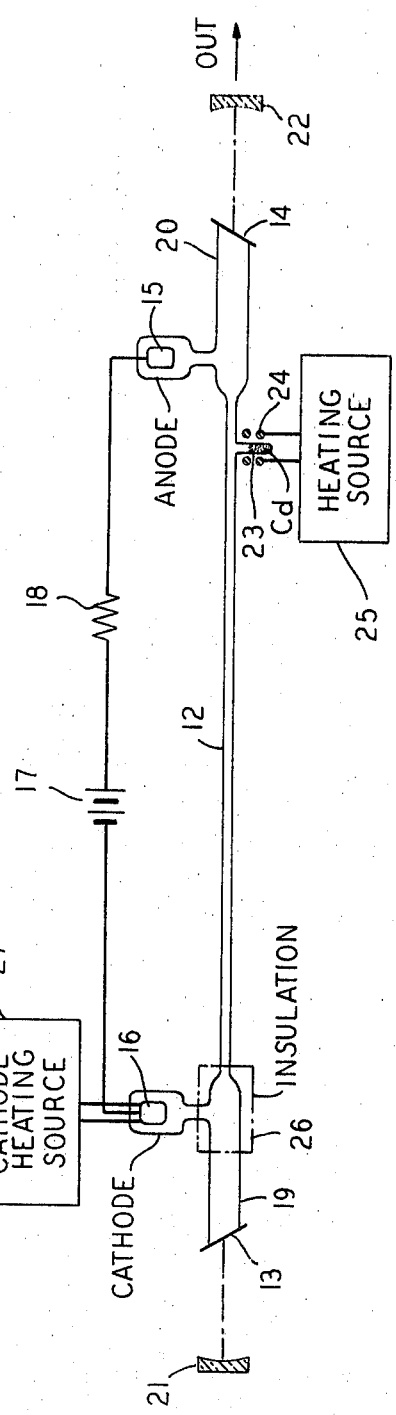
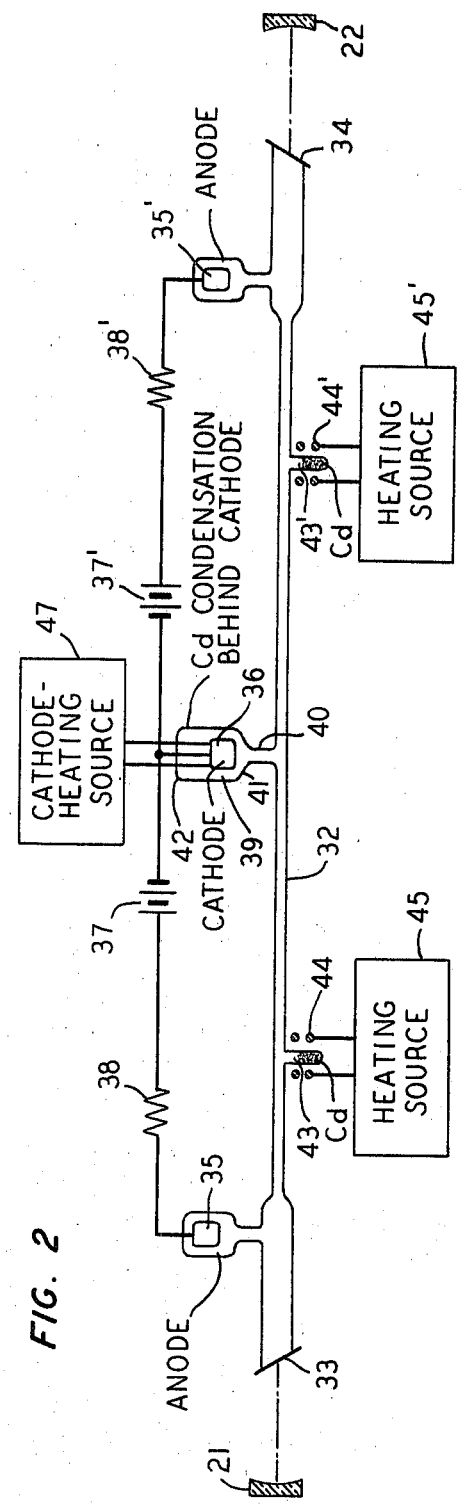

METAL ION LASER HAVING AN AUXILIARY GAS

BACKGROUND OF THE INVENTION

This invention relates to gas lasers, particularly those in which one of the constituent gases can be occluded or gettered by condensation of another constituent on the tube walls.

One of the most promising gaseous ion lasers described in the literature of the laser art is the cadmium ion laser that employs helium as an auxiliary gas. This laser is of interest because it can operate both at 441.6 nm (nanometers) in the blue region of the spectrum and at 325.0 nm in the ultraviolet region of the spectrum and can produce a continuous-wave or pulsed output with modest discharge currents. These frequencies are attractive for many uses, such as optical memories.

One of the most significant problems encountered when operating sealed off helium-cadmium lasers is in the rapid loss of helium from the gaseous volume in and around the discharge. In the most severe cases, several torr (1 torr equals 1 millimeter of mercury) pressure of the helium may be lost after only a few hours of tube operation.

This loss of helium is much too rapid to be explained by diffusion through the glass walls of the discharge tube. A more reasonable explanation may be inferred from our observations that, after such helium loss, large quantities of helium could be released into the tube volume by heating areas of the tube where cadmium had condensed. In contrast, the heating of other areas of the tube had no effect on the helium partial pressure.

SUMMARY OF THE INVENTION

Accordingly, our invention is based on our discovery that helium is lost or gettered in areas where cadmium vapor is condensing and, further, on our discovery that the net loss is temperature dependent and also dependent upon the proximity of the discharge to the region of condensation. Our observations show that the amount of helium that can be occluded or gettered by the condensing cadmium is inversely related, though not inversely proportional, to the distance from the discharge to the region of condensation. There exists a separation from the active discharge region at which the ability of condensing cadmium to occlude or getter helium can be made negligible. At lesser separations the gettering is small if the temperature of the region of condensation is high enough, illustratively above about 150° C.

One embodiment of a gas laser according to our invention provides a region of the tube for cadmium vapor condensation relatively removed from the discharge, or enlarged to reduce the intensity of the discharge there, and maintains that region above about 150° C but lower in temperature than other regions of the tube accessible to the cadmium vapor.

Specifically, in the first embodiment of our invention, the tube was flared to a substantially increased diameter at an axial position near the cathode along the discharge path. For the typical discharge conditions, the desired temperature of the flared region was obtained by a simple wrap of aluminum foil to provide some thermal insulation.

In a preferred embodiment of our invention, the cathode is disposed at a position in its housing to establish along the housing portion in front of the cathode a decrease in wall temperature extending to the region behind the cathode, where the cadmium vapor then condenses. Typically, the cathode is moved closer to the small-diameter portion of the housing than in the prior art; and a larger empty volume is left behind the cathode.

The latter embodiment of the invention is advantageously employed in a double-ended tube having a centrally disposed cathode.

Nevertheless, reversible single-ended tubes can be used according to our invention. In such tubes, the condensation region is similar to the cadmium reservoir and occupies a position near the cathode symmetrical to the position of the reservoir near the anode. When the roles of anode and cathode are interchanged, the roles of reservoir and condensation regions are interchanged. The modified use of such reversible tubes according to our invention includes simultaneous heating of both the reservoir and condensation region to reduce the temperature difference therebetween, in view of the closeness of the condensation region to the active discharge. The condensation region temperature is preferably maintained above 150° C.

BRIEF DESCRIPTION OF THE DRAWING

Other features and advantages of our invention will become apparent from the following detailed description, taken together with the drawing, in which:

FIG. 1 is a partially pictorial and partially schematic illustration of the early embodiment of our invention; and FIG. 2 is a partially pictorial and partially schematic illustration of the preferred embodiment of our invention.

DESCRIPTION OF ILLUSTRATIVE EMBODIMENTS

In the embodiment of FIG. 1, the illustrated cadmium ion laser can be operated to obtain a useful output at 441.6 nm (nanometers $= 1 \times 10^{-9}$ meters) in the blue region of the spectrum or at 325.0 nm in the ultraviolet region of the spectrum, or both, by appropriate choice of the reflectors 21 and 22 comprising the optical resonator. They may be multiple-layer dielectric coated reflectors or internal reflection prisms (not shown).

The gas mixture of cadmium vapor with about 5 torr of helium as an auxiliary gas is contained in the tube 12 of high-temperature glass and of 3 millimeter internal diameter in the central portion. Tube 12 has quartz end windows 13 and 14 with antiparallel Brewster-angle orientation.

A discharge is established through the gas mixture by the conventional pumping circuit including, in series, anode 15, ballast resistor 18, battery 17 and cathode 16 heated by conventional means including the heating current source 27.

Tube 12 is flared at the ends to form regions 19 and 20 of about 8 millimeters inside diameter. Just beyond flared region 20 in a direction away from anode 15 is located the sidearm or reservoir 23 containing cadmium of the desired isotope mixture. The reservoir 23 and the cadmium are heated by a heating coil 24 energized by the heating current source 25 to vaporize the cadmium controllably, although the cadmium could also be vaporized by a discharge of sufficient intensity if non-vaporized cadmium is relatively close to the discharge.

To prevent gettering of helium by cadmium condensing in region 19, that region was loosely wrapped in our early experiments with tinfoil to maintain its temperature illustratively about 100° C. The tinfoil is one example of insulation 26 which may be provided for a portion of region 19 appreciably removed from end window 13. We have found that cadmium vapor condenses in region 19 before it can reach window 13. For longest operating life of the laser, insulation 26 is modified to maintain the temperature of the insulated region at about 150° C, as will be understood from the following description of operation.

In operation, the discharge, e.g., at a current level of 125 milliamperes, ionizes the cadmium vaporized from reservoir 23. The electric field gradient along the discharge transports the positive cadmium ions by an effect called cataphoresis toward cathode 16. Metastable helium atoms are formed in the discharge and facilitate the establishment of a population inversion in the ionized cadmium, apparently by a collisional energy transfer in which appropriate elevated energy levels of the cadmium ion are populated and in which excess metastable energy is imparted to free electrons. The stimulated emission of radiation now can result at the resonated wavelength or at the wavelength of an input signal.

With the decrease in temperature from reservoir 23 to region 19, cadmium condenses only in the region 19, which is the coolest region accessible to cadmium vapor. At this temperature and slightly removed from the active discharge, or at least at a less intense region of the discharge, the condensed cadmium in region 19 getters much less helium than in the prior art. The active discharge has a lower current density, and thus a lower intensity, in this region because of the increased cross-sectional area of the tube.

It would be desirable to condense the transported cadmium vapor farther from the active discharge than is feasible in the embodiment of FIG. 1, as our later experiments have shown that the helium loss rate was largest in regions where the discharge in adjacent tube volumes was strongest.

A preferred way to satisfy all of the criteria set out above is to induce condensation of cadmium only on the walls of the cathode housing behind the cathode. The shaping of the walls around the cathode can then maintain the desired temperature distribution having its lowest value behind the cathode. The discharge is nonexistent there.

Such a modified embodiment is shown in the double-ended tube arrangement of FIG. 2, in which components similar to those of the embodiment of FIG. 1 are numbered with numbers 20 digits higher than the corresponding components in FIG. 1. Similar components in the symmetrical halves of the arrangement are numbered the same except for primed numbers in the right-hand half of the embodiment of FIG. 2.

The principal difference from the embodiment of FIG. 1 resides in the lack of any significant flare in tube 32 in the vicinity of the housing 39 for cathode 36. Indeed, the entry portion 40 of the housing can have approximately the same diameter as tube 32. The cathode 36 is disposed sufficiently close to the walls of the portion 41 of cathode housing 39 to heat portion 41 so that cadmium cannot condense there. The lowest temperature of the housing 39 occurs at its wall 42 farthest (e.g., about 7 centimeters but at least 5 centimeters) behind the cathode away from the active discharge. Cataphoresis transports cadmium to housing 39; and the cadmium condenses on the wall 42.

The operation of the embodiment of FIG. 2 is substantially similar to that of the embodiment of FIG. 1 with the exception that the helium loss can be almost totally avoided with the lack of discharge in the immediate vicinity.

The reason for this fact is not well understood; but the various mechanisms of gettering may include not only the burying of helium atoms by subsequently condensed cadmium atoms when the helium atoms are in the vicinity of or adhering to the walls (occlusion of the auxiliary gas), but also may include tunneling or diffusion of accelerated helium ions into cadmium layers already present. The latter explanation would provide one reason for the strong dependence of the helium loss on the intensity of the electrical discharge in the surrounding volume. Nevertheless, we do not wish our invention to be limited by this explanation. In any event, all of the possible mechanisms may be termed gettering.

We claim:

1. A laser comprising a tube supplied with helium and having a reservoir containing cadmium, a cathode and anode disposed to supply a direct-current discharge through said tube in said helium to drive vapor of said cadmium from said reservoir toward said cathode and to invert the population of a radiative transition in said vapor, said reservoir being disposed nearer to said anode than to said cathode, means comprising an enlarged portion of the tube nearer to said cathode than to said anode and substantially removed from the electric field of the discharge for providing a condensation region for the driven cadmium at a temperature at least as low as a condensation temperature for said cadmium and above about 100° C whereby gettering of the helium by condensed cadmium is inhibited, and means aligned with the axis of the tube for stimulating the emission of coherent radiation from said vapor.

2. A laser according to claim 1 in which the means for providing the condensation region of the tube in the aforesaid temperature range comprises means for disposing a portion of the tube walls in the vicinity of the cathode at a greater distance from the axis of the discharge than in a central portion of the tube, and means for thermally insulating said portion in the vicinity of said cathode.

3. A laser according to claim 1 in which the providing means for maintaining the condensation region at temperatures above about 150° C.

4. A laser comprising a tube supplied with helium and having a reservoir containing cadmium, a cathode and anode disposed to supply a direct-current discharge through said tube in said helium to drive vapor of said cadmium from said reservoir toward said cathode and to invert the population of a radiative transition in said vapor, means forming a portion of said tube on the opposite side of said cathode with respect to the path of said discharge and substantially removed from the electric field of the discharge for providing a condensation region for the driven cadmium at the lowest temperature in the cathode housing whereby gettering of the helium by condensed cadmium is inhibited, and means aligned with the axis of the tube for stimulating the emission of coherent radiation from said vapor.

5. A laser according to claim 4 in which the tube is shaped to prevent condensation of the cadmium between the reservoir and the condensation region.

6. A laser according to claim 4 in which the means forming a portion of the tube behind the cathode is separated from the cathode by at least about 5 centimeters.

7. A laser comprising a tube supplied with an auxiliary gas and having a reservoir containing a vaporizable material supplying the active gas, a cathode and anode disposed to supply a direct-current discharge through said tube in said auxiliary gas to drive vapor of said active gas from said reservoir toward said cathode and to invert the population of a radiative transition in said vapor, means forming a portion of said tube on the opposite side of said cathode with respect to the path of said discharge and substantially removed from the electric field of said discharge for providing a condensation region for said vapor at the lowest temperature in the cathode housing whereby gettering of the helium by condensed cadmium is inhibited, and means aligned with the axis of the tube for stimulating the emission of coherent radiation from said vapor.

8. A laser according to claim 7 in which the means forming a portion of the tube behind the cathode is separated from the cathode by at least about 5 centimeters.

9. A laser according to claim 8 in which the vaporizable material is cadmium and the means forming a portion of the tube behind the cathode is separated from the cathode by about 7 centimeters.

10. A laser according to claim 7 in which the tube is symmetrical about the cathode sidearm.

* * * * *